United States Patent
More et al.

(10) Patent No.: US 9,946,471 B1
(45) Date of Patent: Apr. 17, 2018

(54) RAID GROUPS BASED ON ENDURANCE SETS

(71) Applicant: EMC Corporation, Hopkinton, MA (US)

(72) Inventors: Sachin More, Northborough, MA (US); Kendell Chilton, Northbridge, MA (US); Barry A. Burke, Tyngsboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 195 days.

(21) Appl. No.: 14/674,896

(22) Filed: Mar. 31, 2015

(51) Int. Cl.
*G06F 3/06* (2006.01)
*G06F 11/00* (2006.01)

(52) U.S. Cl.
CPC .......... *G06F 3/0616* (2013.01); *G06F 3/0638* (2013.01); *G06F 3/0689* (2013.01); *G06F 11/004* (2013.01)

(58) Field of Classification Search
CPC .... G06F 3/0616; G06F 3/0638; G06F 3/0689; G06F 11/004; G06F 2212/7211; G06F 2212/7208; G06F 12/0246; G06F 2212/1036
See application file for complete search history.

(56) References Cited

U.S. PATENT DOCUMENTS

| | | | |
|---|---|---|---|
| 7,139,863 B1* | 11/2006 | Defouw | G06F 12/0246 365/185.33 |
| 7,865,761 B1* | 1/2011 | Chilton | G06F 12/023 711/103 |
| 7,962,779 B2* | 6/2011 | Patel | G06F 11/1076 714/4.12 |
| 8,176,367 B2* | 5/2012 | Dreifus | G11C 29/76 714/47.2 |
| 8,375,187 B1* | 2/2013 | Chilton | G06F 13/00 711/114 |
| 9,652,352 B1* | 5/2017 | Chilton | G06F 11/34 |

(Continued)

FOREIGN PATENT DOCUMENTS

EP     1840722 A2 * 10/2007  ......... G06F 12/0246

OTHER PUBLICATIONS

Jimenez, Xavier, David Novo, and Paolo Ienne. "Wear unleveling: improving NAND flash lifetime by balancing p. endurance." Proceedings of the 12th USENIX Conference on File and Storage Technologies (FAST 14). 2014.*

(Continued)

*Primary Examiner* — David Yi
*Assistant Examiner* — Francisco A Grullon
(74) *Attorney, Agent, or Firm* — Anderson Gorecki LLP (57) ABSTRACT

The wear of storage devices in a storage array or storage server cluster is unleveled via modal Read/Write to create a plurality of endurance sets, each endurance set having devices with statistically similar amount of wear in a given period of time, and different endurance sets are subjected to different amounts of wear over a given period of time. The storage devices are organized into RAID groups such that multiple devices associated with the same RAID group are not members of the same endurance set. The number of devices in each endurance set may be selected to match the number of spare failover storage devices.

20 Claims, 6 Drawing Sheets

(56) References Cited

U.S. PATENT DOCUMENTS

| | | | | |
|---|---|---|---|---|
| 2002/0194427 A1* | 12/2002 | Hashemi | ............ | G06F 11/1096 |
| | | | | 711/114 |
| 2006/0206738 A1* | 9/2006 | Jeddeloh | ................ | G06F 1/206 |
| | | | | 713/320 |
| 2007/0016719 A1* | 1/2007 | Ono | .................... | G06F 12/0804 |
| | | | | 711/103 |
| 2008/0219053 A1* | 9/2008 | Kim | ................... | G11C 16/0483 |
| | | | | 365/185.11 |
| 2010/0306580 A1* | 12/2010 | McKean | ............ | G06F 12/0246 |
| | | | | 714/6.13 |
| 2012/0079318 A1* | 3/2012 | Colgrove | ............. | G06F 3/0688 |
| | | | | 714/6.22 |
| 2012/0131304 A1* | 5/2012 | Franceschini | ....... | G06F 12/0246 |
| | | | | 711/202 |

OTHER PUBLICATIONS

"Flash Implications in Enterprise Storage Array Designs" EMC (whitepaper), 2013.*

Wilkes, John, et al. "The HP AutoRAID hierarchical storage system." ACM Transactions on Computer Systems (TOCS) 14.1 (1996): 108-136.*

* cited by examiner

RAID GROUPS BASED ON ENDURANCE SETS

CROSS-REFERENCE TO RELATED APPLICATIONS

NA

BACKGROUND

Aspects of this disclosure are generally related to data storage systems. Data storage systems are used to maintain relatively large data sets and support a relatively large number of concurrent users. The basic building blocks of storage may include storage arrays or storage server clusters. Examples of storage arrays, which will be used herein for the purposes of explanation, include the VMAX family of storage array products of EMC Corporation. Each storage array typically includes multiple physical storage devices which are used by storage directors to present logical volumes of storage. Different types of physical storage devices may be used, and the devices may be organized in hierarchical tiers based on performance. Storage devices may exhibit wear and eventually fail as a function of use. RAID groupings and other techniques may be implemented to decrease the likelihood of data loss and help maintain data availability.

SUMMARY

All examples, aspects and features mentioned in this document can be combined in any technically possible way.

In accordance with an aspect, an apparatus comprises: a plurality of physical storage devices configured as a plurality of RAID groups; and at least one controller configured to present a logical storage device to at least one host device, the logical storage device associated with the physical storage devices of a first RAID group of the plurality of RAID groups, the controller being further configured to perform wear unleveling of the physical storage devices of the first RAID group via modal Read/Write of the physical storage devices such that each of the physical storage devices of the first RAID group fails at different times. In some implementations the at least one controller comprises at least one storage director of a storage array. In some implementations the controller is configured to perform wear unleveling of the physical storage devices via modal Read/Write to create a plurality of endurance sets, each endurance set comprising physical storage devices undergoing statistically similar amount of wear in a given period of time, and physical storage devices belonging to different endurance sets are subjected to different amount of wear over a given period of time. In some implementations the apparatus further comprises a plurality of spare failover physical storage devices numbering equal to or greater than a number of physical storage devices per endurance set. In some implementations the at least one controller is configured to observe writes and determine a distribution of writes per cycle for the physical storage devices. In some implementations a virtualization table maps between the presented logical storage device and a plurality of internal logical storage devices associated with the physical storage devices in accordance with the distribution of writes per cycle. In some implementations a number of cache slots are allocated to store data written by host to the first RAID group, and at least one controller is configured to allocate the cache slots of the first RAID group to the storage devices of the first RAID group in accordance with the distribution of writes per cycle. In some implementations modal Read/Write state is updated based on a number of write pending cache slots relative to allocated cache slots for each physical storage device of the first RAID group. In some implementations the physical storage devices of the first RAID group are designated as either Write-only or Read-only during a time period, and modal Read/Write state is updated based on a number of write pending cache slots to the physical storage device designated as Write-only relative to a first threshold, and a number of write pending cache slots to one of the physical storage devices designated as Read-only relative to a second threshold. In some implementations the at least one controller is configured to level writes to the physical storage devices when a predetermined wear of the physical device is achieved.

In accordance with an aspect a method comprises: configuring a plurality of physical storage devices as a plurality of RAID groups; presenting a logical storage device to at least one host device, the logical storage device associated with the physical storage devices of a first RAID group of the plurality of RAID groups; and performing wear unleveling of the physical storage devices of the first RAID group via modal Read/Write of the physical storage devices such that each of the physical storage devices of the first RAID group fails at a different time. In some implementations performing wear unleveling of the physical storage devices via modal Read/Write creates a plurality of endurance sets, each endurance set comprising physical storage devices undergoing statistically similar amount of wear in a given time period, and physical storage devices belonging to different endurance sets are subjected to different amount of wear over a given period of time. In some implementations the endurance sets to include a number of physical storage devices which is not greater than a number of spare failover physical storage devices. In some implementations the method comprises observing writes and determining a distribution of writes per cycle for the physical storage devices. In some implementations the method comprises maintaining a virtualization table which maps between the presented logical storage device and a plurality of internal logical storage devices associated with the physical storage devices in accordance with the distribution of writes per cycle. In some implementations the method comprises allocating a number of cache slots to the first RAID group, and allocating the cache slots of the first RAID group to the storage devices of the first RAID group in accordance with the distribution of writes per cycle. In some implementations the method comprises updating modal Read/Write state based on a number of write pending cache slots relative to allocated cache slots for each physical storage device of the first RAID group. In some implementations the physical storage devices of the first RAID group are designated as either Write-only or Read-only during a time period, and the method comprises updating Read/Write state based on a number of write pending cache slots to the physical storage device designated as Write-only relative to a first threshold, and a number of write pending cache slots to one of the physical storage devices designated as Read-only relative to a second threshold. In some implementations the method comprises leveling writes to the physical storage devices when a predetermined wear of the physical devices is achieved.

In accordance with an aspect a non-transitory computer-readable memory having program code comprises: logic which configures a plurality of physical storage devices as a plurality of RAID groups; and logic configured to perform wear unleveling of the physical storage devices via modal Read/Write to create a plurality of endurance sets, each endurance set comprising ones of the physical storage devices undergoing statistically similar amount of wear in a given time period, and physical storage devices belonging to different endurance sets are subjected to different amount of wear over a given period of time.

DETAILED DESCRIPTION

Figure 1:
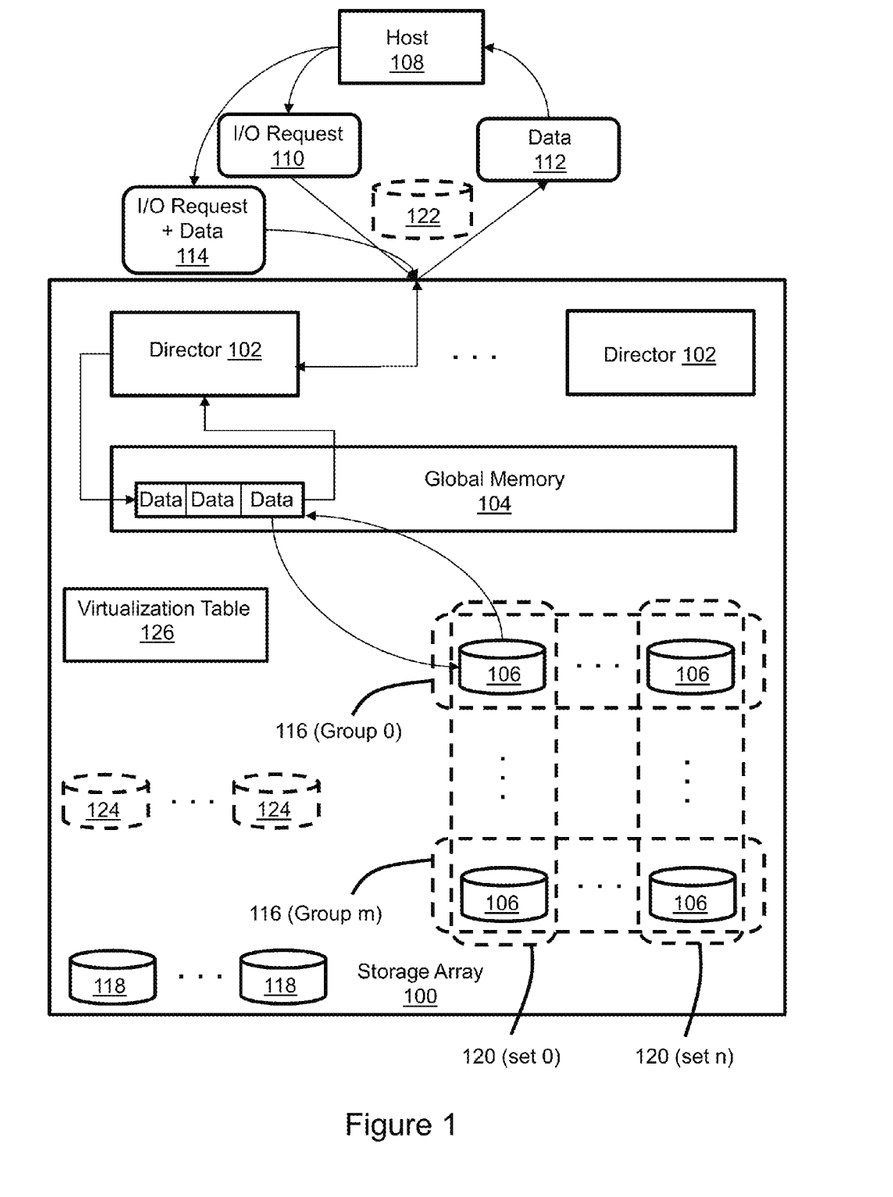
FIG. 1 illustrates a storage array with RAID groups based on endurance sets.

FIG. 1 illustrates a storage array 100 which could be used in a data center in a network "cloud" environment. The storage array 100 maintains data and may support a large number of concurrent users. Subsystems of the storage array 100 include storage directors 102, a global memory cache 104 and physical storage devices 106. Each storage director 102 includes an interface for communicating with a host device 108 to service I/O requests. The global memory cache 108, which is illustrated as a single logical memory resource, could be implemented in multiple physical memory devices, e.g., multiple volatile memory components such as RAM (random access memory) chips, which may be distributed across multiple physical subsystems, e.g., on separate printed circuit boards associated with different ones of the storage directors 102. Examples of physical storage devices 106 that may be used in the storage array include but are not limited to SSDs (solid state drives, e.g., flash) and HDDs (hard disk drives, e.g., with spinning magnetic media). Moreover, a variety of different types of storage devices may be used in combination within the storage array. For ease of understanding of features described in this document the storage devices 106 are assumed to be SSDs or other storage devices for which endurance (remaining life) is a function of amount of wear due to use.

Computing devices such as user terminals and servers use the data maintained in the storage devices 106 of the storage array 100 by communicating with the host device 108. The host device may be a server, e.g., a block or file server, or may host an application, e.g., a database, for example and without limitation. The storage directors 102 present at least one logical volume of storage 122, e.g., a TDEVs (thin device), to the host device 108. The host device 108 sends I/O requests 110, 114 associated with the logical volume to the storage array 100 in order to Read and Write data. Although I/O requests from the host reference the logical volume, the data associated with the logical volume is maintained by the physical storage devices 106. A cache slots section of the global memory 104 is used to temporarily store selected data. For example, data may be copied to the global memory 104 from the storage devices 106 in response to a hint or an I/O Read request 110 by the host device 108. This can enhance performance because when data 112 is requested that is in the global memory 104 RAM, i.e., a "cache hit," then that cached copy of the data can be used to quickly service the I/O request. When the requested data 112 is not in the cache slots in global memory RAM, i.e. a "cache miss," then that data is copied from the SSD storage devices 106 into the global memory 104 RAM and subsequently used to service the I/O request. Data associated with a Write I/O request 114 is initially written to global memory 104 and subsequently flushed from global memory and written to a storage device 106. Generally, any data that has not been accessed recently or within a predetermined period of time may be flushed from global memory 104 and written to the storage devices 106. The storage directors 102 may operate in parallel such that I/O requests are concurrently serviced and the failure of one director does not cause the failure of other directors.

The physical data storage devices 106 are organized into one or more RAID groups 116 (e.g., RAID Groups 0 through m) in order to help avoid data loss and enhance performance. Aspects are not limited to a particular type of RAID group, but 3+1 RAID-5 groups will be described for purposes of explanation. Within each RAID-5 group 0-m there is block-level striping across the storage devices of the group. Parity information is maintained and distributed among the storage devices of the group. If any single storage device should fail then that failed storage device can be rebuilt from the data and parity information stored on the non-failed storage devices of the group. However, contemporaneous failure of multiple storage devices within the same group can result in data loss and should therefore be avoided. Spare failover storage devices 118 may be included in the storage array 100 so that a failed storage device in a RAID group 116 can be rebuilt automatically and without manual replacement of the failed storage device. However, failed storage devices will typically be replaced with operational storage devices in accordance with regular maintenance activity.

Storage devices 106 such as SSDs can present potential problems even when RAID groupings are used. Within a RAID group 116 the storage devices may be subjected to similar average use, e.g., number of writes over time. SSDs exhibit wear as a function of use so their endurance is a function of the number of write operations performed. If the SSDs of a RAID group process a similar number of average writes over time there is a risk that multiple SSDs within the same RAID group will fail contemporaneously, or with sufficient nearness in time to create an unacceptable risk of data loss. As will be described below, an aspect of a solution to this problem is to maintain the storage devices of a RAID group at different levels of endurance.

Figure 2A:
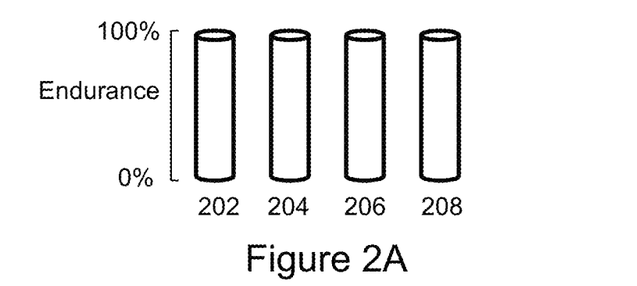
FIGS. 2A, 2B, 2C and 2D illustrate unleveled usage-based wearing of storage devices in a RAID group.
Figure 2B:
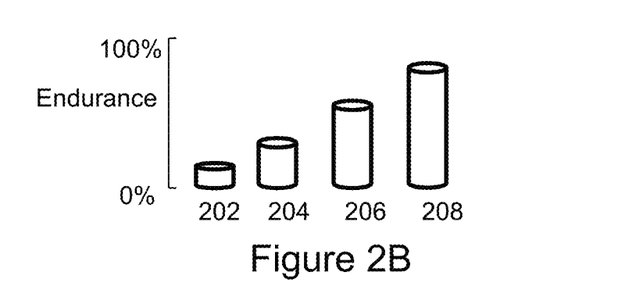

As illustrated in FIG. 2A, the storage devices 200, 202, 204, 206 in an exemplary 3+1 RAID-5 group initially have the same endurance, i.e., the maximum endurance, shown graphically as device height in the figure. For storage devices for which endurance is a function of use, the endurance of the storage devices can be skewed as shown in FIG. 2B by controlling use of the individual storage devices over time. For example, the endurance of SSD storage devices can be skewed via controlled data allocation. Unleveled access is described in Chilton, U.S. Pat. No. 7,865,761 ACCESSING MULTIPLE NON-VOLATILE SEMICONDUCTOR MEMORY MODULES IN AN UNEVEN MANNER, which is incorporated by reference. In general, subjecting the storage devices to different numbers of write operations unlevels endurance. Although a linear endurance skewing profile is depicted in FIG. 2B, endurance skewing could be implemented in accordance with a wide variety of functions, and unleveling of endurance and use may continue through to failure of one or more storage devices. When a target endurance skewing profile of relative endurance between devices is achieved then the unleveled use of the devices is stopped. Leveled use may result normally from uncontrolled allocation of writes and random placement of data. However, use may be actively leveled, e.g., by leveling write operations. Leveled use maintains the endurance skewing profile although the endurance of individual devices changes over time. Endurance monitoring may be implemented to verify that usage is leveled and the endurance skewing profile is maintained. Further unleveled use may be restored to recreate an endurance skewing profile if necessary.

Figure 2C:
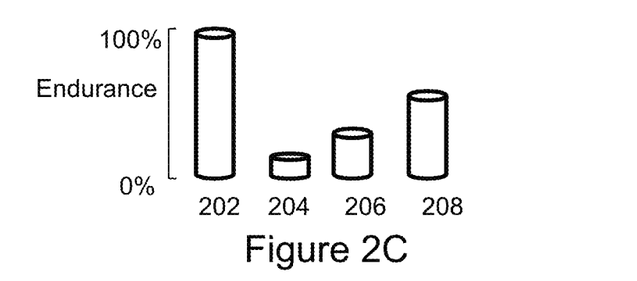
Figure 2D:
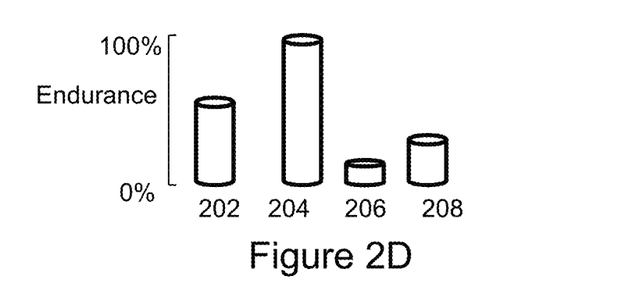

With reference to FIG. 2B, the storage device 202 with the least endurance according to the initial skewing will fail first as a result of leveled use over time. That failed device 202 is then rebuilt using a failover spare storage device as indicated in FIG. 2C. The rebuilt device 202 has maximum endurance and therefore becomes the highest endurance storage device in the RAID group. The endurance skewing profile is maintained, although shifted and wrapped in the figure. The endurance of the devices further decreases over time in accordance with continued leveled use. It is apparent with reference to FIG. 2D that at a later time the storage device 204 with the second least endurance according to the initial skewing will fail next in accordance with leveled use. That failed device 204 is then rebuilt using another failover spare storage device. That device 204 has maximum endurance and therefore becomes the highest endurance storage device in the RAID group. This continues such that the endurance skewing profile is maintained (shifted and wrapped) each time a device is rebuilt. At any point in time the most likely storage device that will next fail is predictable. Further, the likelihood of contemporaneous failure of multiple storage devices within the group is reduced, and the time between failures is more predictable.

Referring again to FIG. 1, endurance skewing can be applied to sets of storage devices to create endurance sets 120. For example, storage devices in an endurance set 120 (set 0) may each have a statistically equivalent level of endurance, e.g., corresponding to the endurance of the storage device 202 with the least endurance in FIG. 2B. Storage devices in an endurance set 120 (set n) may each have a statistically equivalent level of endurance, e.g., corresponding to the endurance of the storage device 208 with the most endurance in FIG. 2B. Storage devices in endurance sets numbered between set 0 and set n have levels of endurance corresponding to set number, e.g., the storage devices of set 14 having more endurance than the storage devices of set 13, the storage devices of set 13 have more endurance than the storage devices of set 12, and so forth. When the endurance of the storage devices in endurance set 0 is exhausted, those storage devices are rebuilt from the failover spare storage devices 118.

For clarity and consistency, endurance set numbering may be related to endurance. For example, endurance sets may be renumbered when an endurance set is rebuilt. Continuing the example described above, the rebuilt storage devices become associated with endurance set n, and the endurance sets are renumbered such that the other storage devices are shifted from their current endurance set number to the next lower endurance set number. In other words, the storage devices in endurance set 1 become endurance set 0, the storage devices in endurance set 2 become endurance set 1, and so forth. Consequently, at any point in time the most likely storage devices to fail next are in endurance set 0.

Figure 3:
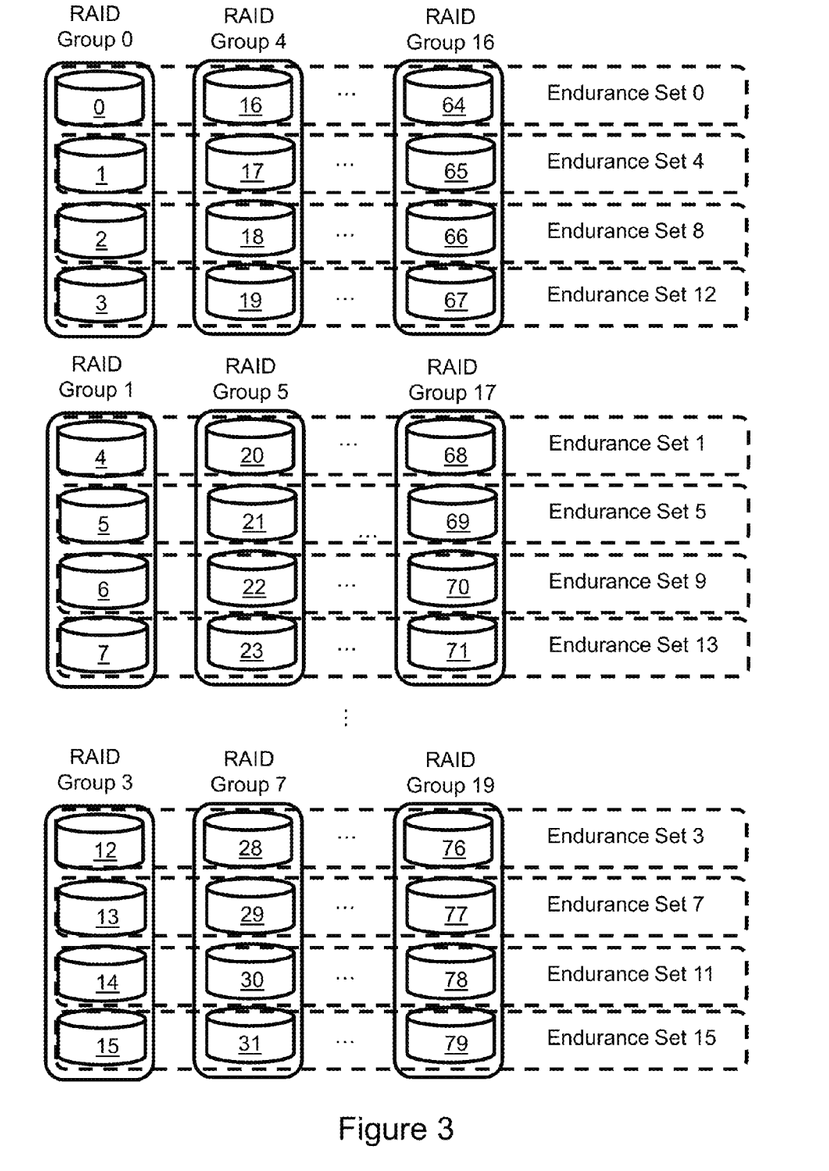
FIG. 3 illustrates a specific example of RAID groups based on endurance sets.
Figure 4A:
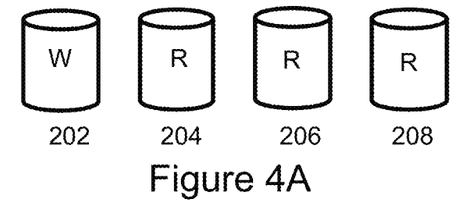
FIGS. 4A, 4B, 4C and 4D illustrate modal Read/Write.
Figure 4B:
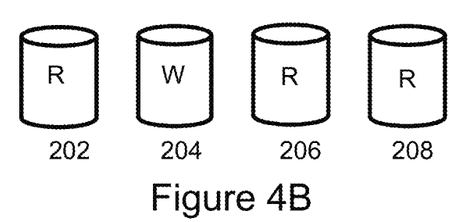
Figure 4C:
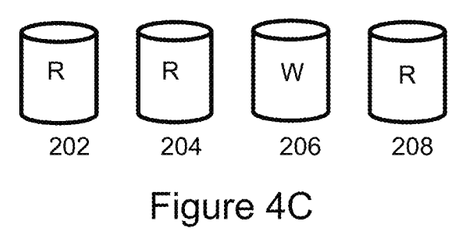
Figure 4D:
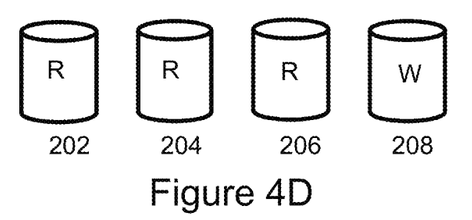

FIG. 3 illustrates a specific example of RAID groups based on endurance sets. In this example the physical storage devices 106 (FIG. 1) comprise eighty identical SSDs (numbered 0 through 79). The failover spare devices 118 (FIG. 1) comprise five identical SSDs. SSDs 0 to 3 belong to a 3+1 RAID-5 group 0, SSDs 4 to 7 belong to a 3+1 RAID-5 group 1, and so on. There are twenty RAID-5 groups in total, numbered 0 through 19. Each endurance set contains a number of SSDs that matches the number of failover spare SSDs, e.g., five. There are sixteen endurance sets in total because there are eighty SSDs with five SSDs per set, i.e., (80/5=16). The endurance sets, which are numbered 0 through 15, have endurance in accordance with the numbering as described above, i.e., endurance set 0 has the least endurance and endurance set 15 has the greatest endurance. Each RAID-5 group includes four SSDs, and each SSD is associated with one of four distinct endurance sets. In other words, multiple SSDs in the same RAID group do not belong to the same endurance set. The associations between SSDs and endurance sets of a RAID group may be selected to be widely and evenly distributed in terms of relative endurance. For example, RAID group 0 includes SSDs 0, 1, 2 and 3 associated with endurance sets 0, 4, 8 and 12, respectively, and RAID group 1 includes SSDs 4, 5, 6 and 7 associated with endurance sets 1, 5, 9 and 13, respectively. The relative spacing between SSDs in all RAID groups in terms of endurance is equal, e.g., the endurance associated with four set spacing. A band of RAID groups associated with the same endurance sets, e.g., RAID groups 0, 4, 8 and 16, will experience temporally proximate SSD failures. Failed SSDs are rebuilt from the available failover spare SSDs because of the relationship between endurance set size and number of failover spare SSDs. However, not all of the RAID groups have storage devices in endurance set 0 so not all RAID groups will experience contemporaneous storage device failure.

Referring now to FIGS. 4A, 4B, 4C, and 4D, the performance of storage devices 202, 204, 206, 208 within a RAID group can be enhanced by a modal Read/Write technique. The performance of SSDs with respect to Read and Write operations differs, with Reads being faster than Writes. Moreover, blocking can occur such that, for example, a Write operation can delay a Read operation. The best Read performance is exhibited by a SSD when only Read operations are processed. Similarly, the best Write performance is exhibited by a SSD when only Write operations are processed. However, an SSD in a RAID group must perform Reads and Writes. Overall performance can be improved by temporally specializing in either Reads or Writes and reducing contention between Reads and Writes. In normal uncontrolled operation a storage device is typically required to perform a mix of Reads and Writes in accordance with when requests are received, which results in non-optimal performance. Modal Reading/Writing controls operations such that during particular time periods of a cycle each storage device performs either only Reads or only Writes. As shown in FIGS. 4A, 4B, 4C, and 4D which represent different time periods of a cycle, in a 3+1 RAID-5 group one of the storage devices is designated as the Write-only device while the other storage devices are designated as Read-only devices. More particularly, storage device 202 is designated as a Write-only device in the time period associated with FIG. 4A while storage devices 204, 206 and 208 are designated as a Read-only devices. In the time period associated with FIG. 4B, storage device 204 is designated as the Write-only device while storage devices 202, 206 and 208 are designated as the Read-only devices. In the time period associated with FIG. 4C, storage device 206 is designated as the Write-only device while storage devices 202, 204 and 208 are designated as the Read-only devices. In the time period associated with FIG. 4D, storage device 208 is designated as the Write-only device while storage devices 202, 204 and 206 are designated as the Read-only devices.

A destaging algorithm and other controls manage interactions with global memory such that the Write-only designated device only processes Write I/Os, and the Read-only designated devices process only Read I/Os. The Read-only and Write-only designations are changed over time during a cycle such that each device is sometimes designated as the Read-only device and sometimes designated as the Write-only device. Pending Writes for the Read-only designated device are held in the global memory. When the Read-only designation of that storage device is changed to the Write-only designation the pending Writes for that storage device are destaged from global memory to the storage device. Pending Reads for the Write-only designated device are rebuilt during the Write-only designation period using the data and parity information on the Read-only designated storage devices. Modal writing is described in Chilton, U.S. Pat. No. 8,375,187 I/O SCHEDULING FOR FLASH DRIVES, which is incorporated by reference. It should be noted that multiple storage devices may be contemporaneously designated as Write-only, and that the use of one Write-only device with three Read-only devices as illustrated is just an example and should not be viewed as limiting.

Referring to FIGS. 1 and 3, a virtualization layer enables placement and movement of data based on write access characteristics to implement use/endurance unleveling and leveling. Not all extents of data are accessed with equal frequency, and the frequency with which an extent is accessed may change over time. In one implementation, the RAID-5 groups are configured such that each of the twenty RAID-5 groups (numbered 0-19) is uniquely associated with one of twenty TDATs (thinly provisioned data devices) 124. All of the TDATS 124 belong to the same storage pool, which is based on storage devices 106 and is the only storage pool in the storage array. TDEVs such as volume 122 all belong to the same storage group. The capacity for the storage group is allocated from the only storage pool in the storage array 100. A virtualization table 126 is used to map an address from a TDEV 122 to an address in one of the twenty TDATs 124, and hence to storage devices 106, to implement wear unleveling in endurance sets 120. Extents which are associated with relatively greater Write activity can be mapped or re-mapped to reside on SSDs associated with endurance sets having relatively greater write access probability which will be subjected to greater unleveled wear, and extents which are associated with relatively less write activity can be mapped or re-mapped to reside on SSDs associated with endurance sets having relatively less write access probability which will be subjected to less unleveled wear.

Figure 5:
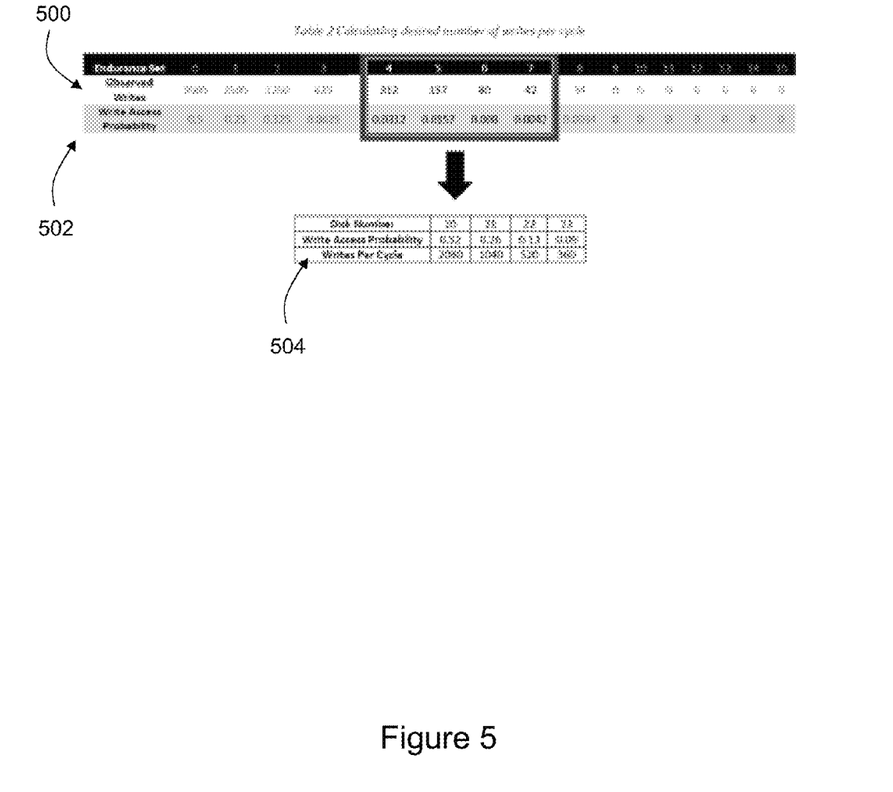
FIG. 5 illustrates calculation of writes per cycle to implement unleveling via modal Read/Write.
Figure 6:
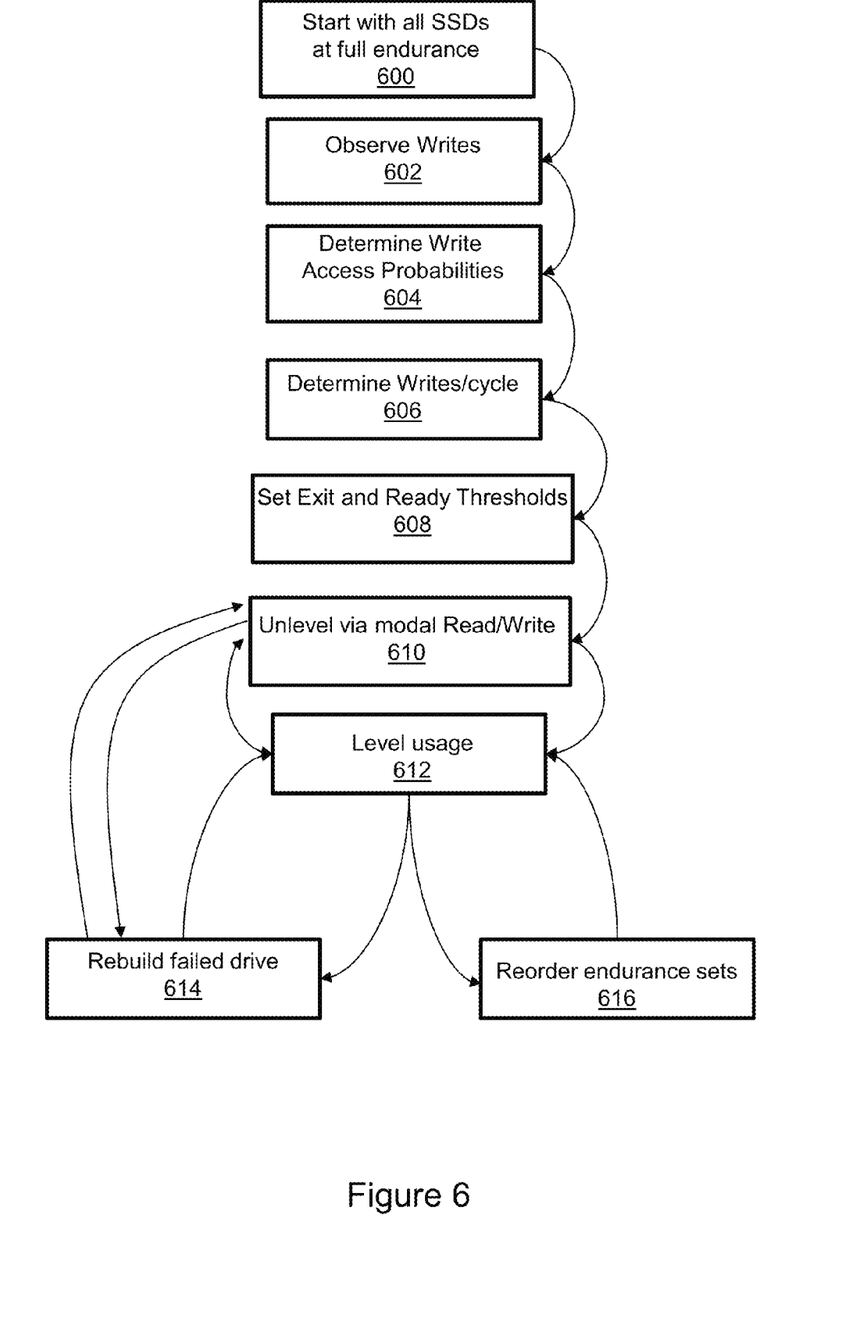
FIG. 6 illustrates a technique for organizing and operating storage devices as RAID groups based on endurance sets.

Referring to FIGS. 5 and 6, in one implementation observed writes 500 are used as a basis for usage unleveling. Starting with an initial condition in which all SSDs are at full endurance as indicated at 600, writes are observed as indicated at 602. The observed writes are used to determine write access probability 502 for each endurance set as indicated at 604, and the write access probability is used to assign writes per cycle for each SSD according to a distribution 504 as indicated at 606. As described above, the virtualization table enables extents to be associated with SSDs based on write activity.

In order to implement the distribution of writes per cycle the Read-only and Write-only designations for individual SSDs are changed based on one or more thresholds which are set as indicated at 608. For example, the Read-only and Write-only designations may be updated when the number of WPs (write pendings) to the current Write-only SSD is below a first threshold, hereafter referred to as the "exit threshold," and the number of WPs to a Read-only SSD in the same RAID group is over a second threshold, hereafter referred to as the "ready threshold." The exit threshold may be initially set to a value which is low enough to ensure that a WP queue behind a particular SSD is sufficiently destaged before updating the Read-only and Write only designations. An example of an initial selection for the exit threshold could be 10% of the corresponding ready threshold. The ready threshold is set according to the expected distribution of writes in the RAID group and the global memory cache slots available for the WPs. For example, if 4000 cache slots in global memory are dedicated for WP data to a targeted 3+1 RAID-5 group then the desired distribution of writes for that endurance set would be used to calculate the desired number of writes per cycle. In the illustrated example SSD number 20 should receive 2080 writes each cycle, so it should have a maximum of about 2080 WP slots in the global memory cache out of the 4000 WP slots allocated for the RAID group. A ready threshold of 2080 WPs could be set for SSD number 20. SSDs 21, 22, and 23 would have ready thresholds of 1040, 520, and 360 set, respectively, in accordance with the distribution (2080+1040+520+360=4000). The exit thresholds would be 10% of the ready thresholds, or 208, 104, 52, and 36 for SSDs 20 through 23, respectively. Therefore, a cycle would occur about every 4000 writes to the RAID group. As the number WPs grows in the global memory cache for the RAID group, the number of WPs per SSD should grow according to the expected distribution of writes. The current Write-only SSD will have relatively fewer WPs in the cache slots, e.g., below the exit threshold. One or more of the Read-only SSDs in the RAID group should exceed their ready thresholds at about the same time, thereby satisfying the conditions for updating the Read-only and Write-only designations. If the Write-only SSD is SSD number 20, for example, and its WP queue is near zero, at some point in time one or more of SSDs 21 through 23 will exceed their ready threshold. At that point SSD number 20 ceases to be Write-only and becomes Read-only, so its WP queue will begin to grow. The next SSD in sequence in the RAID group, which is SSD number 21, is selected to be the Write-only SSD. Once SSD number 21 destages at least 936 (1040−104) WP slots it will reach its exit threshold and cease to be the Write-only SSD if, e.g., SSD number 22 has reached its ready threshold by that time. SSD number 22 will then destage at least 468 (520−52) WP slots before the Write-only designation is updated again. Finally, SSD number 23 will have the Write-only designation and destage at least 324 (360−36) WP slots. At this point, SSD number 20 may or may not have reached its ready threshold. If it has then SSD 20 is designated as the Write-only SSD and a new cycle begins. Otherwise, SSD number 23 remains the Write-only SSD until some other SSD in the RAID group reaches its ready threshold. Consequently, usage in terms of writes is unleveled via modal Read/Write as indicated at 610. Cycling continues until the desired endurance skewing profile is achieved. Usage is then leveled as indicated at 612. Failed SSDs are rebuilt as indicated at 614. In one implementation the endurance skewing profile is considered to have been achieved when all SSDs in endurance set 0 have been rebuilt. At that point usage is leveled and the endurance sets are reordered as indicated at 616. More particularly, endurance set 0 becomes endurance the highest numbered endurance set, e.g., 15, and endurance sets from 1 to 15 are reassigned from 0 to 14. The wear unleveling scheme described above is replaced by a wear leveling scheme when endurance set 0 becomes endurance set 15 for the first time. The wear leveling scheme balances the writes so that all endurance sets receive equal number of writes. Unleveling may be reinstated if the skewing profile is not maintained.

It should be noted that the thresholds may be overridden to ensure that WPs do not excessively age. For example, a timer or some other criteria may be used to override the thresholds to minimize the tenure of WPs in cache and force the cycle to progress and new cycles to begin. The thresholds may start at a calculated value and be adjusted dynamically, e.g., if the workload requires compromises for factors such as write performance. It would not be set to zero because writes may arrive continuously.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising: a plurality of physical storage devices configured as a plurality of RAID (Redundant Array of Independent Disks) groups; and at least one controller configured to present a logical storage device to at least one host device, the logical storage device associated with the physical storage devices of a first RAID group of the plurality of RAID groups, the controller being further configured to perform wear unleveling between the physical storage devices of the first RAID group via modal Read/Write of the physical storage devices such that each of the physical storage devices of the first RAID group fails at different times.

2. The apparatus of claim 1 wherein the at least one controller comprises at least one storage director of a storage array.

3. The apparatus of claim 1 wherein the controller is configured to perform wear unleveling of the physical storage devices via modal Read/Write to create a plurality of endurance sets, each endurance set comprising physical storage devices undergoing statistically similar amount of wear in a given period of time, and physical storage devices belonging to different endurance sets are subjected to different amounts of wear over a given time period.

4. The apparatus of claim 3 wherein the controller configures a number of physical storage devices per endurance set that is not greater than a number of spare failover physical storage devices.

5. The apparatus of claim 3 wherein the at least one controller is configured to observe writes and determine a distribution of writes per cycle for the physical storage devices.

6. The apparatus of claim 5 further comprising a virtualization table which maps between the presented logical storage device and a plurality of internal logical storage devices associated with the physical storage devices in accordance with the distribution of writes per cycle.

7. The apparatus of claim 5 wherein a number of cache slots for write are allocated to store data written by host to the first RAID group, and wherein at least one controller is configured to allocate the cache slots of the first RAID group to the storage devices of the first RAID group in accordance with the distribution of writes per cycle.

8. The apparatus of claim 7 wherein modal Read/Write state is updated based on a number of write pending cache slots relative to allocated cache slots for each physical storage device of the first RAID group.

9. The apparatus of claim 7 wherein the physical storage devices of the first RAID group are designated as either Write-only or Read-only during a time period, and modal Read/Write state is updated based on a number of write pending cache slots to the physical storage device designated as Write-only relative to a first threshold, and a number of write pending cache slots to one of the physical storage devices designated as Read-only relative to a second threshold.

10. The apparatus of claim 7 wherein the at least one controller is configured to level writes to the physical storage devices when a predetermined wear of the physical device is achieved.

11. A method comprising: configuring a plurality of physical storage devices as a plurality of RAID (Redundant Array of Independent Disks) groups; presenting a logical storage device to at least one host device, the logical storage device associated with the physical storage devices of a first RAID group of the plurality of RAID groups; and performing wear unleveling between the physical storage devices of the first RAID group via modal Read/Write of the physical storage devices such that each of the physical storage devices of the first RAID group fails at a different time.

12. The method of claim 11 comprising performing wear unleveling of the physical storage devices via modal Read/Write to create a plurality of endurance sets, each endurance set comprising physical storage devices undergoing statistically similar amount of wear in a given time period, and physical storage devices belonging to different endurance sets are subjected to different amounts of wear over a given period of time.

13. The method of claim 12 further comprising configuring the endurance sets to include a number of physical storage devices which is not greater than a number of spare failover physical storage devices.

14. The method of claim 11 comprising observing writes and determining a distribution of writes per cycle for the physical storage devices.

15. The method of claim 14 comprising maintaining a virtualization table which maps between the presented logical storage device and a plurality of internal logical storage devices associated with the physical storage devices in accordance with the distribution of writes per cycle.

16. The method of claim 14 comprising allocating a number of cache slots to the first RAID group, and allocating the cache slots of the first RAID group to the storage devices of the first RAID group in accordance with the distribution of writes per cycle.

17. The method of claim 16 comprising updating modal Read/Write state based on a number of write pending cache slots relative to allocated cache slots for each physical storage device of the first RAID group.

18. The method of claim 16 wherein the physical storage devices of the first RAID group are designated as either Write-only or Read-only during a time period, and comprising updating Read/Write state based on a number of write pending cache slots to the physical storage device designated as Write-only relative to a first threshold, and a number of write pending cache slots to one of the physical storage devices designated as Read-only relative to a second threshold.

19. The method of claim 16 comprising leveling writes to the physical storage devices when a predetermined wear of the physical storage devices is achieved.

20. A non-transitory computer-readable memory having program code comprising: logic which configures a plurality of physical storage devices as a plurality of RAID (Redundant Array of Independent Disks) groups; and logic configured to perform wear unleveling between the physical storage devices via modal Read/Write to create a plurality of endurance sets, each endurance set comprising ones of the physical storage devices undergoing statistically similar amount of wear in a given period of time, and different endurance sets are subjected to different amounts of wear over a given period of time.

\* \* \* \* \*